Figure 1:
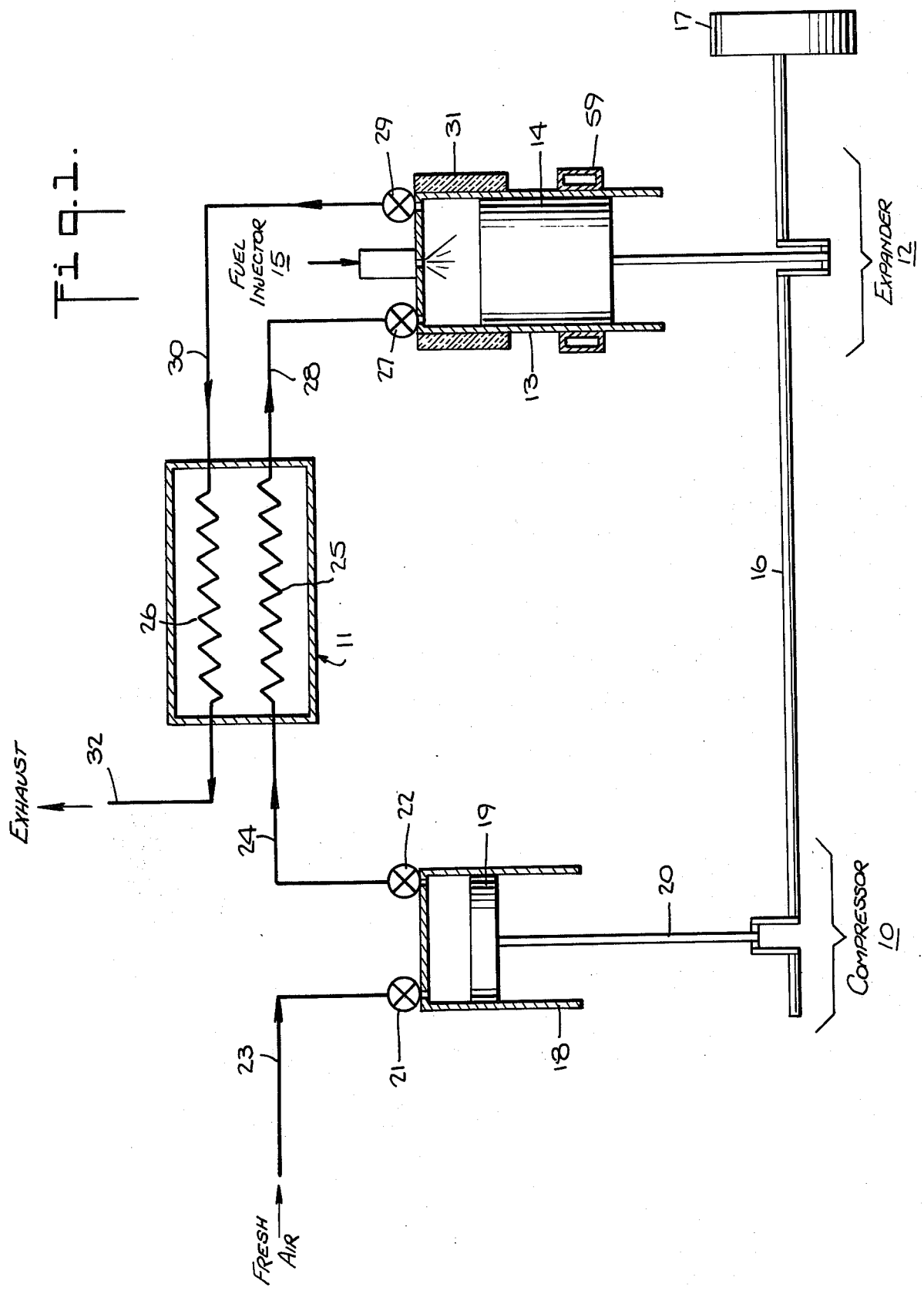

United States Patent [19]
McFee

[11] 4,333,424
[45] Jun. 8, 1982

[54] INTERNAL COMBUSTION ENGINE

[76] Inventor: Richard McFee, R.D. #1, Union Springs, N.Y. 13160

[21] Appl. No.: 116,456

[22] Filed: Jan. 29, 1980

[51] Int. Cl.³ ............................................. F02B 33/00
[52] U.S. Cl. ........................................ 123/39; 123/68; 123/46 R
[58] Field of Search ................................ 123/68, 39, 46

[56] References Cited

U.S. PATENT DOCUMENTS

| | | | |
|---|---|---|---|
| 2,973,751 | 3/1961 | Blackmer | 123/39 |
| 3,148,668 | 9/1964 | Bianchi | 123/68 |
| 3,320,740 | 5/1967 | Hamkins | 123/46 |

Primary Examiner—Wendell E. Burns
Attorney, Agent, or Firm—Kenyon & Kenyon

[57] ABSTRACT

The engine has a compressor which compresses air for delivery via a heat exchanger to an expander. The expander receives the compressed air and fuel and, while combustion occurs during a power stroke, the air pressure is reduced to atmosphere and the expander drives a crankshaft. The fuel is injected at a rate to maintain the air temperature at the entry temperature. The exhaust passes through the heat exchanger to heat the incoming flow of compressed air to the expander. Energy may be stored via the crankshaft or used directly.

14 Claims, 5 Drawing Figures

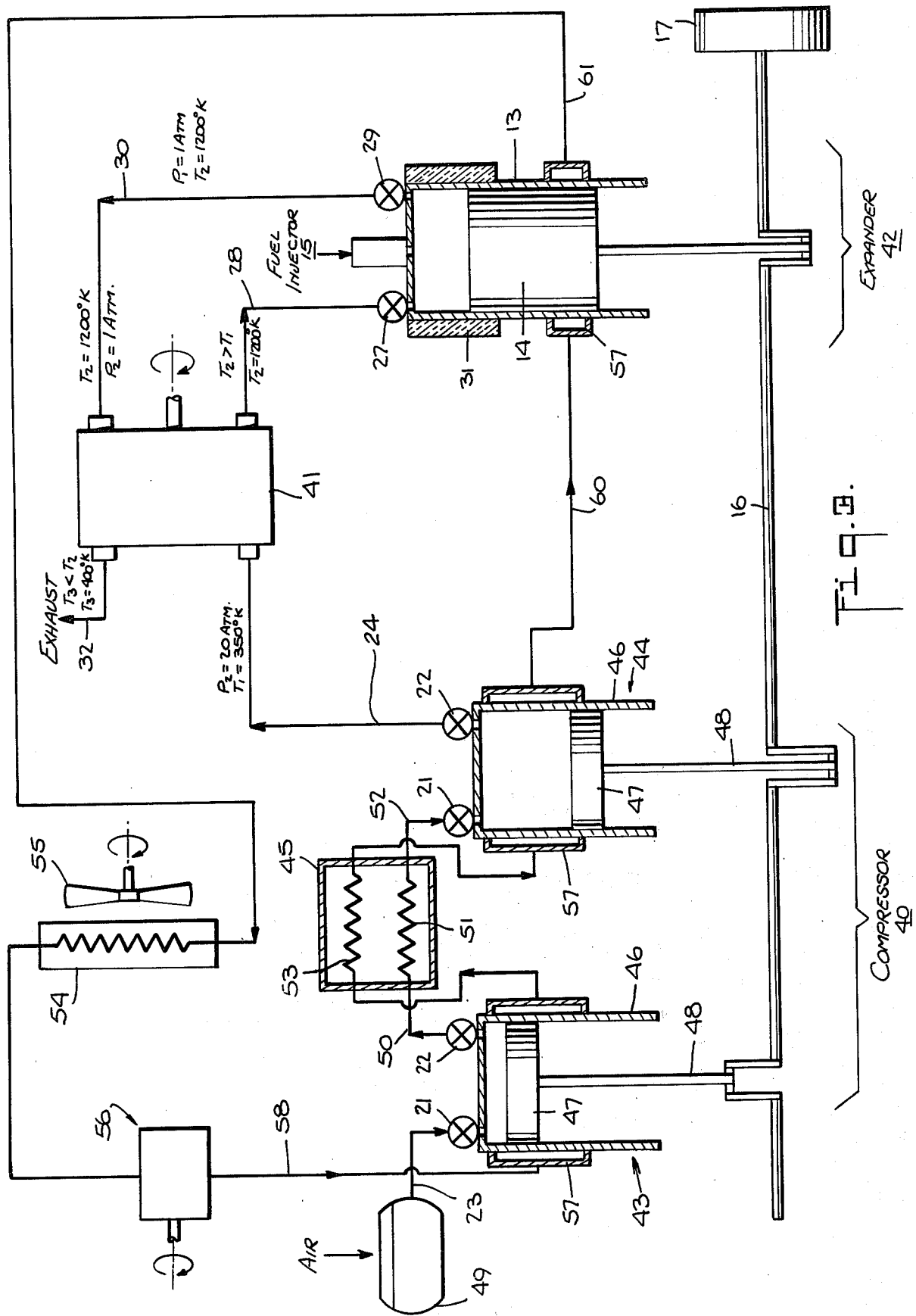

INTERNAL COMBUSTION ENGINE

This invention relates to an internal combustion engine. More particularly, this engine relates to an internal combustion engine of high efficiency.

As is known, most internal combustion engines now in use are of the gasoline or diesel type. These engines are preferred to steam engines which were formerly employed mainly because of their high efficiency, usually of the order of 20 to 35%. Nevertheless, the efficiencies of these engines are only a fraction of that theoretically possible. For example, for peak combustion temperatures of about 2000° K., the efficiency of a Carnot engine operating between 2000° K. and 300° K. (room temperature) is (2000-300)/2000) or 85%, i.e. roughly three times 20 to 35%. The reasons for the large discrepency between theoretical potential and actual practice are well known; heat losses to the engine coolant and grossly inadequate expansion of the combustion gases. Another factor is the pressure drop in the carburetor (of gasoline engines) at part load. As these engines are highly developed, substantial reduction in the losses just cited are unlikely unless there are drastic changes in the configuration of the engine.

In one attempt to achieve a more efficient engine, attention has been directed to an internal combustion engine of the "Brayton" type, i.e. one employing separate compressors and expanders. Units of this type using gas turbines as expanders and compressors are widely used. Generally, simple Brayton engines, employing a compressor, heater, and expander, are limited to low efficiency except at high pressure ratios. However, a turbo-machinery operates best at relatively low pressure ratios, of the order of 3 to 5 to one. Despite this, good efficiency can be obtained with a Turbo-Brayton engine if a heat exchanger is added to the engine so that the heat from the exhaust of the expander is used to pre-heat the compressed air entering the combustor. This is known as a regenerative Brayton engine. This type of engine is well developed, with a maximum efficiency in units of modest size (100 Kw) of the order of 30% (small units, i.e. 10 Kw, do not perform nearly this well). The efficiency of gas turbine engines is, however, limited by the maximum temperatures at which they can operate with good reliability and also by losses in the turbocompressor and expander, of the order of 15% each. Substantial improvements in efficiency are unlikely unless radically new materials, such as ceramics, can be used for turbine blades and such improvements will inevitably be modest due to compression/expansion losses.

Reciprocating internal combustion Brayton engines received attention briefly about 100 years ago but were then abandoned. Brayton's original engine was of the reciprocating type. One known version of the simple reciprocating Brayton engine was manufactured as the "Buckett furnace gas engine" during the last quarter of the 19th century. This type of engine was studied again during the latter 1960's as a possible means to reduce air pollution caused by automobiles. Despite the reduced emissions, the net advantages of this engine were not judged sufficiently marked to justify development for commercial use.

The development of high efficiency engines of the external combustion type is also being studied. Stirling engines have received much attention. It now appears that overall efficiencies (including combustor) of the order of 30% are to be expected for Stirling units with ratings of the order of 100 Kw. Larger units may attain efficiencies approaching those of diesels.

Thus, no engine now available (except perhaps the large Diesel) has an efficiency substantially greater than one third of the potential efficiency (85%) of an internal combustion engine.

Accordingly, it is an object of the invention to provide an internal combustion engine capable of high efficiency (i.e. of the order of two thirds of the Carnot efficiency).

It is another object of this invention to provide an internal combustion engine capable of burning a wide variety of fuels.

It is another object of the invention to provide an internal combustion engine which has reduced levels of unburned hydrocarbons, carbon monoxide, and soot in the exhaust from the engine.

It is another object of the invention to provide an internal combustion engine of simple and inexpensive construction which can operate over long periods of time with little maintenance and high reliability.

It is another object of the invention to provide an internal combustion engine capable of conserving energy.

Briefly, the invention provides an internal combustion engine which is comprised of an air compressor, a heat exchanger, at least one expander having a cylinder and piston reciprocally mounted in the cylinder, means for injecting fuel into the cylinder and means connected to the piston for absorbing and storing the energy of a power stroke of the piston for subsequent use.

The air compressor is constructed of one or more stages so as to receive and compress a flow of air to a given pressure and temperature.

The heat exchanger defines a first flow path for receiving a pressurized flow of air from the compressor and a second flow path for receiving a flow of air in heat exchange relation with the first path in order to heat the flow in the first flow path to a higher second temperature while cooling the flow in the second flow path.

The piston of the expander is reciprocally mounted for movement in a power stroke and an exhaust stroke. In addition, the expander has an inlet valve connected to the first flow path of the heat exchanger in order to direct a flow of compressed air at the higher second temperature into the cylinder during an intake phase of the power stroke. The inlet valve is then closed and an expansion phase of the power stroke takes place in which the pressure of the air is reduced to atmospheric. Also, the expander has an outlet valve connected to the second flow path of the heat exchanger in order to deliver an expanded flow of air at the higher second temperature from the cylinder to the second flow path during the exhaust stroke.

The means for injecting fuel into the cylinder operates during the expansion phase of the power stroke to cause the temperature of the air in the cylinder at the end of the power stroke to be slightly greater than that of the air entering the cylinder during the intake phase of the power stroke. To this end, the injection means injects fuel in an amount adequate to maintain the temperature of the air at or above the temperature upon entry during the expansion phase.

The means for absorbing and storing energy may include a crankshaft which is connected to the piston of each expander as well as to the compressor for driving the compressor. In this regard, the crankshaft also has a fly wheel mounted thereon for absorbing energy during the expansion stroke of the cylinder and for delivering the stored energy to the compressor during the compression stroke.

The fuel injection means includes a fuel injection valve for injecting fuel into the expander cylinder in an open condition of the valve during the expansion phase of the power stroke. In the case of liquid fuels, use may be made of a cam operated plunger similar to those used in a Diesel engine to spray the fuel into the expansion cylinder during the expansion phase of the power stroke. In the case of a gaseous fuel, injection is initiated by the opening of an injection valve. To this end, for an isothermal expansion, use is made of a first conduit having an orifice of predetermined size for conveying a flow of fuel, a plenum connected to the conduit to receive the flow of fuel and a second conduit having an orifice of larger size than the first conduit which is connected between the plenum and the injection valve in order to deliver a flow of fuel from the plenum to the injection valve.

The efficiency of internal combustion engines is increased by using large cylinders and by operating the engines slowly. Some cooling of the cylinder wall is generally required to prevent excessive loss in wall strength due to heat. With a large cylinder, the ratio of surface area to volume is smaller. Thus, the heat loss to the walls is less. Slow speed operation produces more complete combustion, decreases pressure drops in valve ports, and decreases mechanical friction. However, engines with large cylinders operating slowly have heavy and expensive crankshafts and enormous flywheels. However, the size of the flywheel needed for a slow speed engine can be decreased by connecting the crankshaft to the flywheel via gears which step up the rotational speed. Both the large crankshaft and the large flywheel can also be eliminated by using the expander to drive a hydraulic pump which in turn drives a small hydraulic motor connected to a small crankshaft and flywheel rotating in unison at high speed. This crankshaft also drives a high speed compressor as well as the load.

With hydraulic pressures of the order of 2000 psi, hydraulic pumps and motors can be constructed to have very good efficiency, roughly 95%. Under these circumstances, the rate of flow of fluid is quite slow and pressure drops in tubing, fittings, valve ports, etc. are correspondingly small.

Figure 2:
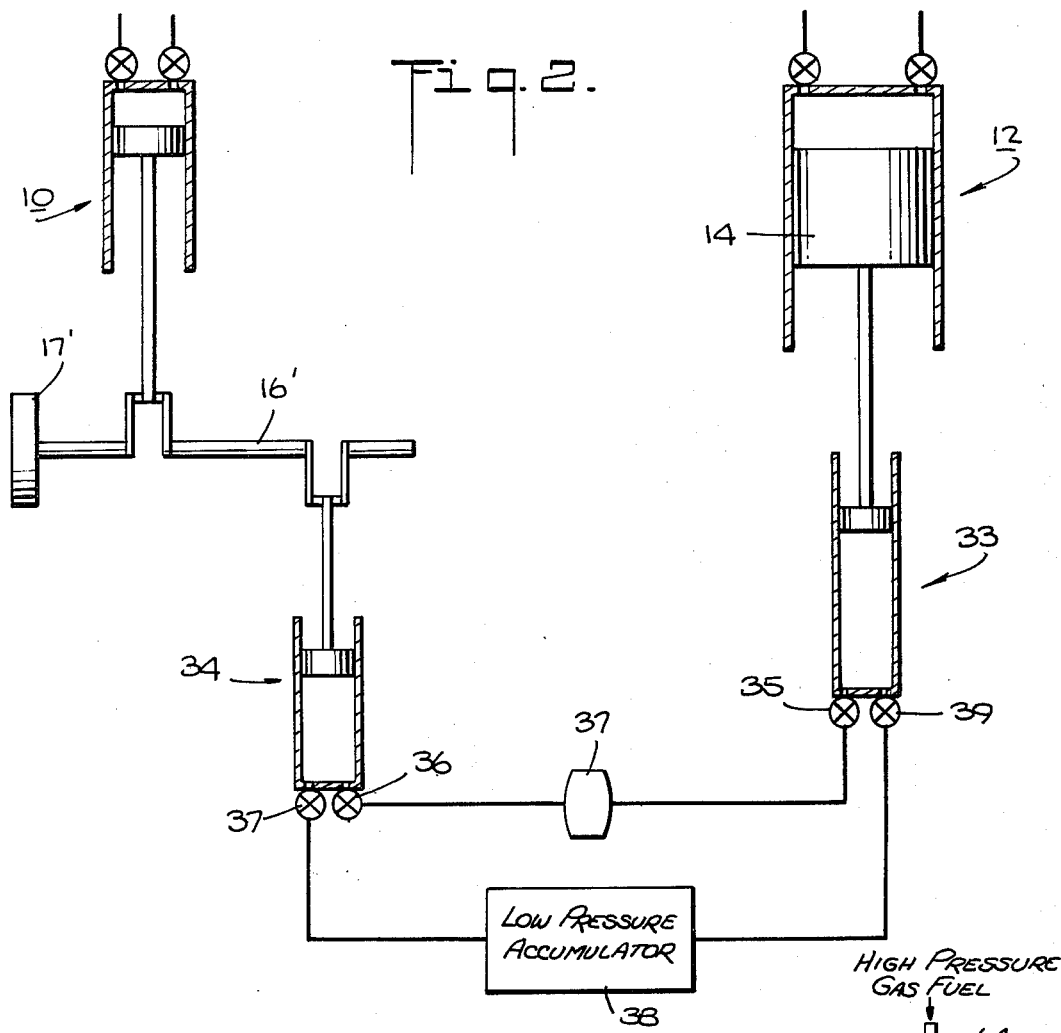
Figure 4:
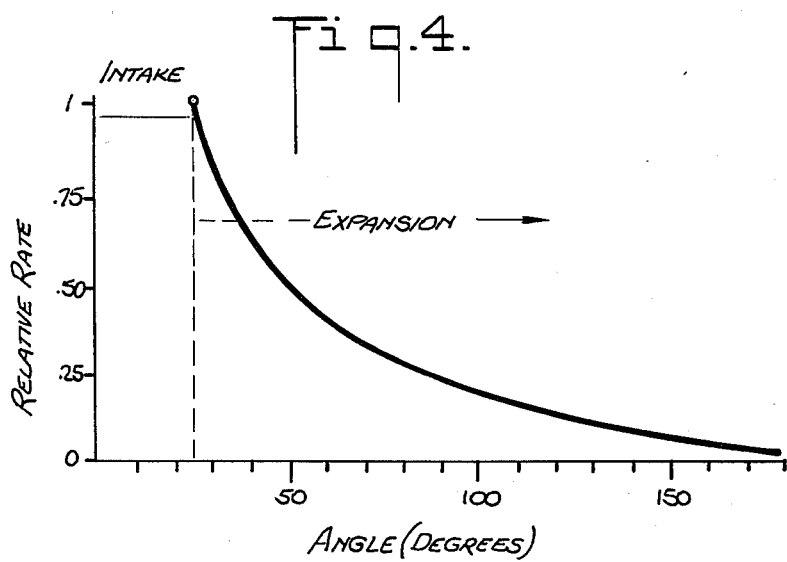
Figure 5:
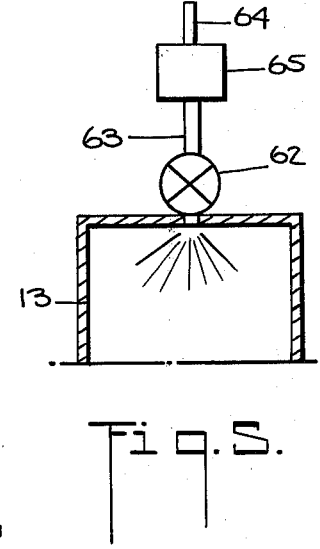

These and other objects and advantages of the invention will become more apparent from the following detailed description and appended claims taken in conjunction with the accompanying drawings in which:

FIG. 1 schematically illustrates an internal combustion engine in accordance with the invention;

FIG. 2 schematically illustrates a hydraulic means for absorbing and storing the energy of expansion in accordance with the invention;

FIG. 3 illustrates a detailed schematic view of an internal combustion engine constructed in accordance with the invention;

FIG. 4 graphically illustrates the rate of fuel injection during an isothermal expansion stroke; and FIG. 5 illustrates a cross-sectional view of the means for injecting gaseous fuel into a cylinder so as to obtain an isothermal expansion in accordance with the invention.

Referring to FIG. 1, the internal combustion engine is comprised of an air compressor 10, a heat exchanger in the form of a recouperator 11, and at least one expander 12. As indicated, the expander 12 includes a cylinder 13 and a piston 14 which is reciprocally mounted in the cylinder 13 for movement in a power stroke and an exhaust stroke. In addition, the engine has a means 15 for injecting fuel into the cylinder 13 during an expansion phase of the power stroke at a rate to maintain the temperature of the air therein at or above the initial temperature. Further, a means in the form of a crankshaft 16 with a fly wheel 17 mounted thereon is connected to the piston 14 for absorbing and storing the energy of each expansion stroke of the piston 14 for subsequent use.

As shown, the compressor 10 is formed of a cylinder 18 in which a piston 19 is reciprocally mounted. The piston 19 is connected via a suitable rod 20 the crankshaft 16. The cylinder 18 is provided with an inlet valve 21 which connects to a feed line 23 for receiving a flow of fresh air. In addition, the cylinder 18 has an outlet valve 22 which connects to an exhaust line 24 for expelling compressed air.

The recouperator 11 defines two flow paths 25, 26. One flow path 25 receives a pressurized flow of air from the compressor 10 via the exhaust line 24 while the second flow path 26 receives a flow of hot gas in heat exchange relation with the first path 25. In this way, the flow in the path 25 is heated to a higher temperature while the flow in the second flow path 26 is cooled.

The expander 12 also has an inlet valve 27 which is connected to the first flow path 25 of the recouperator 11 over a suitable line 28. The inlet valve 27 serves to direct a flow of compressed air at the high temperature into the cylinder 13 during an intake phase of the power stroke of the piston.

During the subsequent expansion phase the pressure of the air therein is reduced to atmospheric. The cylinder 13 also has an outlet valve 29 which is connected via a suitable line 30 to the second path 26 in the recouperator 11 so as to deliver an expanded flow of air from the cylinder 13 to the recouperator 11 during the exhaust stroke of the piston 14. As indicated, the upper portion of cylinder 13 is surrounded with thermal insulation 31 for purposes as explained below. The second flow path 26 of the recouperator connects to an exhaust line 32 for exhausting the gases.

Referring to FIG. 2, wherein like reference characters indicate like parts as above, the piston 14 of the expander 12 can alternatively be coupled to a crankshaft 16' for a high speed flywheel 17' by means of a hydraulic pump 33 which drives a hydraulic motor 34. As shown, the pump 33 is in the form of a piston-cylinder pump connected to the piston 14 and which has an outlet valve 35 which is opened during the entire power stroke of the expander 12 to deliver a hydraulic medium, such as oil, at gradually decreasing pressure to an inlet valve 36 of the hydraulic motor 34 which is also of the piston-cylinder type and which executes many cycles during a single downstroke of the expander 12. A small plenum 37' with a gas bag (not shown) prevents the intermittant flow of oil to the motor 34 from causing a similar intermittant motion of the pump and expander pistons. A low pressure accumulator 38 is connected between an outlet valve 37 of the motor 34 and an inlet valve 39 of the pump 33 such that during the exhaust stroke of the expander 12, oil flows from the low pressure accumulator 38 into the pump 33 under a pressure slightly above atmospheric. This causes the expander piston 14 to move upward thereby expelling the exhaust. The inlet valve 39 of the pump 33 is kept open during this interval. The valve 37 of hydraulic motor 34 is held open during the exhaust stroke of the expander 12, so as to "free wheel", as is known in the art.

Other types of hydraulic motors can also be used, for example, gear motors, vane motors, and the like. The high speed crankshaft 16' drives the compressor 10, for example through speed reduction gears. This arrangement is particularly suited to large versions of the engine, e.g. 1000 Kw, which are capable of efficiencies of order of 60%.

The engine illustrated in FIG. 1 may be viewed as a regenerative internal combustion reciprocating Brayton engine in which the combustor has been replaced by a diesel-like fuel injector which injects fuel directly into the expander 12. However, unlike a diesel, the air into which the fuel is sprayed is so hot (i.e. roughly 1200° K.) that the fuel ignites and burns almost instantly, as in a furnace. The air in the expander is so hot that gaseous fuels having high ignition temperatures, such as methane and propane, can also be injected, rather than being mixed with air prior to intake as in the "dual fuel" compression-ignition engine. With this "regenerative Brayton Diesel" engine (hereinafter RBD engine) the cetane rating of the fuel is of no concern and a variety of fuels can be burned, e.g. fuel oil, kerosene, gasoline, alcohol, and the like.

In "isothermal" operation of the RBD engine, fuel is injected continuously during the expansion phase of the power stroke (at a tapered rate), so that the gas temperature stays almost constant. Actually, a small temperature rise is required, so that the gas exiting the expander 12 can exchange heat with that entering (in the heat exchanger 11). In isothermal operation, the fuel acts not to heat the gas but only to prevent cooling of the gas during the expansion. The expansion volume ratio is adjusted so that the pressure at the end of expansion is about the same as that of the atmosphere. To the extent that the compression can also be considered to be isothermal (this is discussed shortly), the isothermal RBD engine operates in a cycle identical to the Stirling cycle, which is known to have the highest possible (Carnot) efficiency. If the RBD engine is operated without cooling of the cylinder walls (which is possible because there are no pre-ignition problems as in gasoline engines or dual-fuel engines), then there is no coolant loss. Also, expansion is complete. Thus, the two principal causes of less-than-ideal efficiency in conventional internal combustion engines are circumvented.

Isothermal operation is not essential in the RBD engine. The bulk of the fuel can be injected at the start of the expansion phase of the power stroke (after the intake phase), producing a sharp rise in temperature and pressure at that time comparable to that which occurs in gasoline or diesel engines. The resulting higher pressures and temperatures will lead to some increase in engine power and efficiency. However, they will also generally lead to the need for cylinder cooling, to heavier cylinders with greater heat leakage down the cylinder walls, to more noise and vibration, and to more gas leakage past rings and ring wear. The reliability of RBD engines is enhanced by operating them with only modest temperature rises during the expansion phase. In any case, the expander volume ratio must be chosen so that the gas pressure after expansion is roughly that of the atmosphere.

A moderate amount of cooling of the walls of the cylinders of RBD engines can be provided by a relatively gentle flow of air past them, serving to prevent a loss of strength due to excessive temperature, as in the cooling of the blades of gas turbines. With temperature differences of the order of 100°-200° K. between expander gas and cylinder walls, the coolant energy loss will be relatively small.

The maximum temperatures which can be used in RBD engines are indicated by the temperature of 1300° K. of inlet temperatures of modern gas turbines, or the wall temperatures of 1500° K. of the adiabatic diesel now under development. The thermodynamic efficiency of an RBD engine operating between 1400° K. and an average compression temperature of 350° K. is (1400-350)/1400 or 75%. With a variety of practical losses taken into account, calculations given below predict a brake efficiency including an allowance for water pump and fan power, of about 51%. With expander pistons of 10 centimeters (cm.) in diameter operating at 1200 RPM with a 10 cm. stroke, the engine will develop about $3\frac{1}{2}$ kw per expander piston.

The chief disadvantage of the engine is that expensive heat resistant materials are required in the expander as the expander valves must operate at very high temperatures. An improtant advantage of the engine, relative to gasoline and diesel engines, is that the high temperature of the gas and walls of the expander, maintained throughout the expansion period, promotes complete combustion, thus reducing the level of unburned hydrocarbons, carbon monoxide and soot in the exhaust. At the same time, with near isothermal operation, the peak temperature is considerably below that found in gasoline and diesel engines, so that $NO_x$ formation is substantially smaller. As in a gas turbine, fuel is burned with nearly twice as much oxygen as is needed for complete combustion.

Referring to FIG. 3, wherein a more detailed illustration of a Regenerative Brayton Diesel Engine is shown, and wherein like characters indicate like parts as above, the engine includes a compressor 40, a regenerator 41 and an expander 42. The compressor 40 has two stages 43, 44 with an intercooler 45 therebetween. Each compressor stage 43, 44 is constructed of a cylinder 46 with a reciprocating piston 47 therein. As indicated, the piston 47 is connected via a piston rod 48 to the crankshaft 16. As above, each cylinder 46 has an inlet valve 21 and an outlet valve 22.

The inlet valve 21 of the first compressor stage 43 is connected to a feed line 23 to receive a flow of air which is drawn in from the outside environment, for example via an air cleaner 49. The outlet valve 22 of the compressor stage 43 connects to a line 50 which connects to one pass 51 of the intercooler 45 so as to deliver a flow of compressed air therethrough. This pass 51, in turn, connects to a line 52 leading to the inlet valve 21 of the compressor stage 44. As above, the outlet valve 22 of the compressor stage 44 connects to the line 24 for passing a flow of compressed air through the regenerator 41 and, after heating therein, to the feedline 28 to the inlet valve 27 of the expander 42.

A coolant circuit is also provided for passing a flow of water through the cylinders 46 of the compressor 40 and the cylinder 13 of the expander 42 in order to cool the cylinders as well as through a second flow path or pass 53 of the intercooler 45 in order to cool the flow of compressed air in the first pass 51. This coolant circuit includes a radiator 54 of conventional structure which is placed downstream of a fan 55 which is driven so as to direct a flow of cooling air through and across the surfaces of the radiator 54 in known manner. In addition, the circuit includes a water pump 56 downstream of the radiator 54 for pumping a flow of coolant such as water through the circuit. In addition, water jackets 57 are disposed about the cylinders 46 of the compressor 40 so as to receive a flow of coolant from the water pump via a suitable line 58.

The water also traverses the second pass 53 of intercooler 45. Likewise, a water jacket 57 is disposed about the lower part of the cylinder 13 of the expander 42 so as to receive a flow of water through a suitable conduit 60 in series with the jackets 57. Also, a return line 61 passes the coolant from the water jacket 57 about the expander cylinder 13 back to the radiator 54.

Cooling of the compressed air serves to keep the average temperature $T_1$ of the air being compressed at a low value and, therefore, reduces the power needed for compression.

The valves 21, 22 of each stage 43, 44 of the compressor 40 may be check valves which are actuated by pressure differences across the valve ports (not shown). However, the pressue drops in these ports will be lower and engine efficiency higher if the valves are actuated by external means, that is by cams which rotate in synchronism with the crankshaft 16.

As indicated, the output of the compressor 40 passes through the regenerator 41, shown here as a rotating drum type. Alternatively, a recouperator or periodically reversed dual regenerator could be used.

The compressed air stream after passing through the regenerator 41 is then expanded isothermally in the expander 42. Thereafter, the exhaust gas from the expander 42 which has the same temperature as the temperature of the compressed air input to the expander 42 flows through the conduit 30 back to and through the regenerator 41 and is cooled therein. Thereafter, the gas is carried by the exhaust pipe 32 to a point of discharge, for example in the atmosphere.

The expander 42 is shown in FIG. 3 with a single cylinder 13 and piston 14 although, in practice, a two cylinder expander with alternating power strokes would give less engine vibration. The expander inlet valve 27 and outlet valve 29 are both actuated by external means, e.g. cams (not shown). A diesel-like fuel injector means 15 continuously injects fuel during the expansion process at a rate calibrated to keep the temperature at or above the temperature $T_2$ of the incoming gas throughout the expansion phase.

The RBD engine overcomes two basic problems which would appear in open cycle internal combustion Stirling Engines. The first problem is that the "dead volume" within the regenerator of such engines would limit the increase in pressure which occurs when the gas is shifted from the cold space to the hot to something of the order of 2-3 to 1. If compression starts at atmospheric pressure this means that the net work per cycle is quite small. It also means that the regenerator must be small. The second problem is that the energy loss due to the pressure drop in the small regenerator is proportional to the kinetic energy of the gas and with relatively dense air, the small pressure drops required to achieve high efficiency can be obtained only at very low speeds in the order of 200 RPM. In the RBD engine, the regenerator dead volume does not interfere with engine operation and the passages can be made sufficiently large, for example by use of a large regenerator so that the regenerator pressure drops can be made as small as desired.

In order to keep the expansion isothermal, if that is desired, the rate of fuel injection must be decreased as the expansion process is carried out. That is, the energy extracted from the gas by the piston must be replaced by heat supplied by combustion of the fuel. The gas gives energy to the piston at a rate proportional to the product of piston speed and gas pressure. If the distance between the dome and the cylinder head is represented as "x"; the volume varies as "x", pressure as 1/x and the piston speed as dx/dt. If the crankshaft angle relative to the top-dead center position of the expander piston 14 is "$\theta$"; then "x" is proportional to $(1-\cos \theta)$. The rate at which fuel is injected, which should be proportional to $(1/x)(dx/dt)$ should therefore be proportional to $(\sin \theta)/(1-\cos \theta)$. This function is shown in FIG. 4 in which it is assumed that the intake is completed when $\theta$ is 25°.

Injection of liquid fuels can be programmed by shaping of a cam that drives a plunger in the fuel injector means 15. With gaseous fuel such as natural gas or hydrogen, an approximation of this curve can be obtained with the arrangement shown in FIG. 5. The injector means 15 consists of a valve 62, two (or more) flow restricting orifices 63,64 and one (or more) small gas plenums 65. When the valve 62 opens the plenum gas discharges into the cylinder 13 during the intake phase of the power stroke at a rate controlled by the size of the large orifice 63 and then at a constant rate determined by the size of the small orifice 64 and the pressure of the gas supply. The injector valve 62 closes slightly before the end of the expansion phase of the power stroke.

The RBD engine is a more or less constant torque machine with some torque reduction at high speeds due to pressure drops in the valve ports. Power output thus is roughly proportional to speed. Speed is conveniently controlled by means of a feedback loop which adjusts the torque of the load, increasing this drag if the speed is high and decreasing it if it is low. Due attention must be paid of course to problems concerning the stability of this feed back loop. If the load is an electric generator (not shown), torque is easily varied by changing the strength of the field of the generator. The system can be designed to hold steady state output voltage of the generator at a prescribed value and to accomodate changes in load at the same time. With mechanical loads, the same result can be achieved through the use of a continuously variable transmission (CVT) whose ratio is controlled by the feedback loop.

The RBD engine has many applications. It is capable of efficiencies comparable to or exceeding those of the best engines now in development, such as the adiabatic diesel, the high temperature gas turbine, and the advanced Stirling engine. These last engines are expected to have efficiencies of the order of 40-45% in units with ratings of 500-2000 kw, but only the Stirling engine is expected to have good efficiency in smaller 2-20 kw units, an efficiency expected to be of the order of 30%. It appears likely, however, that RBD engines with ratings of 2-20 kw can be built which will have efficiencies exceeding 40%. Thus, the RBD engine has promise as a high efficiency engine for compact cars and small "total energy systems". With total energy systems powered by conventional diesels of 30-35% efficiency (in which these engines drive generators and heat pumps while simultaneously supplying heat and hot water) net fuel consumption is roughly half of what it is with a conventional arrangement of a local furnace, central electric power station, and a local electrically powered air conditioner. Fuel consumption in total energy systems varies approximately inversely with efficiency. Thus, fuel consumption with an advanced engine of 60% efficiency would be about half of what it is with diesel engines now available, i.e. one quarter the conventional value.

There is no question that RBD engines can be built which will operate reliably over long periods of time. However, attainment of high reliability with high efficiency requires high operating temperatures and the use of materials which remain strong and do not corrode at these temperatures. The materials problems of RBD engines are quite similar to those of diesel engines, gas turbines and Stirling engines. Cylinders and pistons of RBD engines are preferably elongated, with rings located deep down on the pistons and lower portions of the cylinders cooled, so that lubricating oil operates at temperatures below that at which oil deterioration starts. Heat leaks can be reduced by thermally insulating the portions of the cylinders in contact with the working gas, and by using the smallest possible cylinder wall thickness to minimize heat flow down these walls. The most difficult materials problem with the RBD engine is associated with the inlet and outlet valves of the expanders, which operate at a temperature of the order of 1200° K. This is about 100° K. less than inlet temperatures of modern automotive gas turbines. Some internal cooling of these valves can be accomplished in much the same way as gas turbine blades are cooled. Peak pressures across these valves are much smaller than they are in diesel engines. This may permit the engine to use some sort of shutter valve which removes itself from the flow stream when it is opened, thereby much reducing heat transfer coefficients between the valve surface and the gas.

The power output of the isothermal RDB engine can be computed assuming that the gas obeys the ideal gas law $PV=(m/M) RT$ where m is the mass of the gas and M the mass of a mole of gas. The expander work $W_e$ is the sum of the intake work $P_2 V_2$ and the expansion work $P_2V_2 Ln(V_1/V_2)$ where $P_2$ and $V_2$ are the initial and $P_1$ and $V_1$ the final pressure and volume. Since temperature is constant at $T_2$ both $P_2V_2$ and $P_1 V_1$ are equal to $(m/M)RT_2$. Also, $(V_1/V_2)$ is $(P_2/P_1)$. Thus:

$$W_e = P_1V_1 [1+Ln(P_2/P_1)]$$

A good estimate of the compressor work $W_c$ can be obtained with the same equation, if the compression is assumed to take place isothermally at the average temperature of the gas during compression, here designated as $T_1$. It follows that $W_c$ can be expressed as $(T_1/T_2)W_e$.

The actual expander work is less than the ideal value $W_e$ by a factor "a" which is less than one, i.e. the actual work is $aW_e$. For the isothermal expansion a value of "a" of 0.95 will be used here. (For expansions which ideally are adiabatic, but in practice are not because of heat exchange with the cylinder wall, lower values of "a" are commonly used. e.g. 0.85-0.90). Likewise, the ideal compressor work $W_c$ is less than the actual work $bW_c$. That is, "b" is greater than one. A typical value is 1.15.

The indicated engine power, i.e. that transferred to the pistons, is $FW'$ where $W'$ is $(aW_e-bW_c)$ and F is a frequency in engine cycles per second. The brake power output p is less than this by a factor $n_m$. This factor accounts for losses due to mechanical friction, water pump, radiator fan and regenerator pressure drop. This factor $n_m$ will be taken to be 0.85.

Assuming that the piston area is 0.008 square meters (with a diameter of about 4 inches) and the length of the intake expansion stroke is 0.1 meter; the volume $V_1$ is 0.0008 cubic meters. The pressure $P_1$ is that the atmosphere, approximately 100,000 newtons per square meter. Assuming that F is 40 Hz (2400 RPM), $T_2$ is 1200° K., $T_1$ is 350° K., the values of a, b and $n_m$ are those given above, and the higher pressure $P_2$ is 20 times the atmospheric pressure $P_1$, then the brake power p per expansion cylinder is found to be 6680 watts. A two cylinder engine would develop 13.4 kilowatts.

The thermodynamic efficiency of an engine can be defined as (W/Q) where "W" is the ideal work per cycle and "Q" the heat which ideally must be supplied to produce this work. In the isothermal RBD engine the thermodynamic efficiency is $n_c$, the Carnot efficiency, and equal to $(T_2-T_1)/T_2$. The actual "brake" efficiency is $n_m (W'/Q')$ where $Q'$ is the actual heat which must be supplied. Thus, the brake efficiency "n" can be written as $n_m (W'/W) (Q/Q')n_c$. The ratio $(W'/W)$ (of net work W' to actual work W) is $(aW_e-bW_c)/(W_e-W_c)$, that is, $(a-b(T_1/T_2))$ divided by $(1-(T_1/T_2))$.

The ratio of $(Q/Q')$ depends on many factors such as heat leaks, etc. In the RBD engine it is given to good approximation by $Q/(Q+Q_r)$ where "Q" is the ideal heat supply during expansion which is equal to the expansion work $P_2V_2 Ln (P_2/P_1)$ and $Q_r$ is the extra heat which must be added because the regenerator or recouperator is less than perfect, so that the air arriving at the expander is not at its outgoing temperature $T_2$ but rather at $(T_2-\Delta T)$, where $(\Delta T)$ is the difference in temperature between the two gas streams at corresponding points in the regenerator or recouperator. To counter this imperfection, heat $Q_r$ equal to $C_p (m/M) (\Delta T)$ must be added to the gas taken into the expander. Noting that Q is $P_2 V_2 Ln (P_2/P_1)$, that is, $(m/M) RT_2Ln(P_2/P_1)$, and noting also that the ratio of the molar heat capacity $C_p$ to the gas constant R is 3.5 for air, the following equation is found for "n".

$$n=n_m[aT_2-bT_1]/T_2[1+3.5(\Delta T/T_2Ln(P_2/P_1))]$$

Using the values of parameters given in the last section along with a value of $(\Delta T)$ of 50 degrees, the efficiency is found to be 50.6%.

The power output of a non-isothermal RBD engine, in which the temperature during the expansion phase rises above the exit temperature $T_2$, will be greater than the value computed for the isothermal case, since gas pressures are greater. The efficiency will also be greater than the isothermal efficiency.

The expander inlet valve 27 opens at top-dead-center. In order to compute the crankshaft angle $\theta_c$ at which the valve 27 should close, the pressure of the expander inlet gas is represented as $P_2$ and the pressure of the atmosphere as $P_1$. The value of "x" when the inlet valve closes is $x_c$ and its value when volume is maximum is $x_m$. Then, the volume at the start of expansion is $x_cA$ and at the end, $x_mA$. In an isothermal expansion, volume varies inversely with pressure (ideal gas). The expander pressure at the end of expansion is to equal that of the atmosphere. Thus $(x_c/x_m)=(P_1/P_2)$. But "x" is proportional to $(1-Cos\theta)$ and "$\theta$" is 180 degrees when volume is maximum. This means that Cos $\theta_c = 1-2 (P_1/P_2)$. For example, if $P_2$ is 20 atmospheres, inlet valve cut-off should occur at 26 degrees.

The hydraulic version of the RBD engine is especially suited to the generation of relatively large amounts of power, e.g. 1000 kw. For example, the expander piston might be one meter in diameter with a one meter stroke. For high efficiency, the piston would operate slowly, e.g. 250 cycles per minute. In such cases, a hydraulic step-up gear and a small, high speed, crankshaft-flywheel can be used to reduce bulk in the engine. For example, the expander piston may drive a hydraulic piston-cylinder pump which is much smaller than the expander since pressures can be greater, e.g. of the order of 100 times greater (e.g. 5000 psi maximum). This pump can be used to drive an even smaller hydraulic piston-cylinder "motor", which executes many strokes (e.g. 10) while the expander piston executes one stroke. The hydraulic motor, in turn, can drive a small crankshaft and flywheel at ten times the speed of the expander, e.g. 2500 RPM. This crankshaft-flywheel also drives the engine "load" such as an alternator, and in addition provides power for the compressor. The high speed crankshaft can thus drive the compressor, e.g. consisting preferably of several compressor pistons, at high speed. A single low speed compressor piston can be driven in the same fashion as the expander piston drives the high speed crankshaft, but reversed. That is, the crankshaft drives a small high speed hydraulic pump that, in turn, drives a relatively large low speed hydraulic motor that, in turn, drives the compressor piston. The compressor can also be driven by a geared speed reduction unit.

What is claimed is:

1. An internal combustion engine comprising
   an air compressor for receiving and compressing a flow of air to a given pressure and temperature;
   a heat exchanger defining a first flow path for receiving a pressurized flow of air from said compressor and a second flow path for receiving a flow of hot gas in heat exchange relation with said first path to heat the flow in said first flow path to a higher second temperature while cooling the flow in said second flow path;
   at least one expander having a cylinder, a piston reciprocally mounted in said cylinder for movement in a power stroke and an exhaust stroke, an inlet valve connected to said first flow path of said heat exchanger to direct a flow of compressed air at said second temperature into said cylinder during an intake phase of said power stroke while allowing the pressure of the air to reduce to atmospheric during a subsequent expansion phase of said power stroke, and an outlet valve connected to said second flow path of said heat exchanger to deliver an expanded flow of air at said second temperature from said cylinder to said second flow path during said exhaust stroke;
   first means for injecting fuel into said cylinder during said expansion phase of said power stroke in an amount adequate to maintain the temperature of the air therein at or above the temperature of the air upon entry therein during said intake phase; and
   second means connected to said piston for absorbing and storing the energy of each expansion stroke of said piston for subsequent use.

2. An internal combustion engine as set forth in claim 1 wherein said second means includes a crankshaft connected to said piston of said expander and to said compressor for driving said compressor and a flywheel mounted on said crankshaft for absorbing energy during said power stroke of said piston and delivering some of the stored energy to said compressor during said exhaust stroke.

3. An internal combustion engine as set forth in claim 2 which further includes a hydraulic pump connected to said piston of said expander to deliver a hydraulic medium during said power stroke, and a hydraulic motor connected to said pump and said crankshaft to receive the hydraulic medium from said pump and to drive said crankshaft.

4. An internal combustion engine as set forth in claim 1 wherein said compressor is a multi-stage compressor.

5. An internal combustion engine as set forth in claim 1 wherein said first means includes a fuel injection valve for injecting gaseous fuel into said cylinder in an opened condition of said injection valve during said expansion phase of said power stroke, a first conduit having an orifice of predetermined size for conveying a flow of pressurized gaseous fuel therein, a plenum connected to said first conduit to receive a flow of fuel therefrom, a second conduit having an orifice of larger size than said first conduit and being connected between said plenum and said injection valve to deliver a flow of fuel from said plenum to said injection valve.

6. An internal combustion engine as set forth in claim 1 which further includes a hydraulic pump connected to said piston of said expander to deliver a hydraulic medium during said power stroke, and a hydraulic motor connected to said pump and said second means to receive the hydraulic medium from said pump and to drive said second means.

7. An internal combustion engine as set forth in claim 6 wherein second means includes a crankshaft having a flywheel thereon for absorbing energy during said power stroke of said piston and delivering some of the stored energy to said compressor during said exhaust stroke.

8. An internal combustion engine as set forth in claim 7 which further includes a second hydraulic pump connected to said crankshaft to deliver a hydraulic medium and a second hydraulic motor connected to and between said second hydraulic pump and said compressor to drive said compressor in response to delivery of the hydraulic medium to said second motor from said second pump.

9. In an internal combustion engine, the combination comprising
   a compressor including at least a pair of cylinders, each said cylinder having an inlet valve for introducing a flow of air into said cylinder and an outlet valve for exhausting compressed air out of said cylinder;
   an intercooler defining a first flow path between an outlet valve of one of said cylinders and an inlet valve of another of said cylinders for conveying a flow of compressed air therebetween, said intercooler defining a second flow path for directing a flow of water in heat exchange relation with said first flow path;
   a heat exchanger defining a first flow path for receiving a pressurized flow of air from said compressor and a second flow path for receiving a flow of hot gas in heat exchange relation with said first path to heat the flow in said first flow path to a higher second temperature while cooling the flow in said second flow path;

at least one expander having a cylinder, a piston reciprocally mounted in said cylinder for movement in a power stroke and an exhaust stroke, an inlet valve connected to said first flow path of said heat exchanger to direct a flow of compressed air at said second temperature into said cylinder during an initial phase of said power stroke while allowing the pressure of the air during a subsequent expansion phase of said power stroke to reduce to atmospheric, and an outlet valve connected to said second flow path of said heat exchanger to deliver an expanded flow of air at said second temperature from said cylinder to said second flow path during said exhaust stroke;

first means for injecting fuel into said cylinder during said expansion phase of said power stroke in amounts adequate to maintain the temperature of the air therein constant and at least at said second temperature;

second means connected to said piston for absorbing and storing the energy of said expansion stroke of said piston; and a coolant circuit for passing a flow of coolant through said cylinders of said compressor and expander to cool said cylinders and through said second flow path of said intercooler to cool the flow of compressed air in said first flow path of said intercooler.

10. The combination as set forth in claim 9 wherein said coolant circuit further includes a water pump for pumping water through said cylinders and intercooler and a radiator connected between said water pump and said intercooler for receiving a flow of heated water therefrom and which further comprises a fan for blowing air through said radiator.

11. The combination as set forth in claim 9 which further comprises an exhaust pipe connected to said second flow path of said heat exchanger to exhaust waste gas therefrom.

12. A method of combusting fuel in an internal combustion engine, said method comprising the steps of directing an initial flow of compressed air at an elevated temperature into a cylinder during an intake phase of a power stroke of a reciprocating piston in the cylinder; and thereafter injecting fuel into the cylinder during an expansion phase of said power stroke in amount adequate to maintain the temperature of the resulting gas at or above its initial temperature.

13. A method as set forth in claim 12 wherein the length of the intake phase of the power stroke is set so that the expanded gas returns to atmospheric pressure after the expansion phase of the power stroke is completed.

14. A method as set forth in claim 13 wherein the rate of fuel injection is varied throughout the expansion phase of the power stroke so as to keep the gas temperature at about the same value as that of the air entering the cylinder during the intake phase of the power stroke.

* * * * *